United States Patent
Patnaikuni et al.

(10) Patent No.: US 11,586,154 B2
(45) Date of Patent: Feb. 21, 2023

(54) USER-WORN DEVICE WITH EXTENDABLE DISPLAY

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 329 days.

(21) Appl. No.: 16/815,406

(22) Filed: Mar. 11, 2020

(65) Prior Publication Data
US 2021/0286323 A1 Sep. 16, 2021

(51) Int. Cl.
| | | |
|---|---|---|
| G06F 1/16 | (2006.01) | |
| G06F 3/0483 | (2013.01) | |
| G06F 3/0488 | (2022.01) | |
| G04G 17/04 | (2006.01) | |
| G04G 21/02 | (2010.01) | |
| G04G 17/08 | (2006.01) | |

(52) U.S. Cl.
CPC .......... *G04G 17/045* (2013.01); *G04G 17/08* (2013.01); *G04G 21/025* (2013.01); *G06F 1/163* (2013.01); *G06F 1/1637* (2013.01); *G06F 1/1656* (2013.01)

(58) Field of Classification Search
CPC .................................................. G06F 1/1652
See application file for complete search history.

(56) References Cited

U.S. PATENT DOCUMENTS

| | | | |
|---|---|---|---|
| 8,870,448 B2 | 10/2014 | Bianco et al. | |
| 11,042,121 B2 | 6/2021 | Bozovic et al. | |
| 2010/0056222 A1* | 3/2010 | Choi ................... | H04M 1/0247 345/1.3 |
| 2012/0147713 A1 | 6/2012 | Vouillamoz | |
| 2015/0077438 A1 | 3/2015 | Tamaki et al. | |
| 2016/0125846 A1 | 5/2016 | Xu et al. | |
| 2017/0150616 A1 | 5/2017 | Li et al. | |
| 2017/0220123 A1 | 8/2017 | Fuchikami et al. | |

(Continued)

FOREIGN PATENT DOCUMENTS

| | | |
|---|---|---|
| DE | 102015104767 B4 | 10/2019 |
| WO | 2018204811 A1 | 11/2018 |

OTHER PUBLICATIONS

Samsung, "Avoid skin irritation from your Samsung smartwatch," Samsung, Printed Jan. 28, 2010, 3 pages, https://www.samsung.com/us/support/troubleshooting/TSG01108928/.

(Continued)

*Primary Examiner* — Nan-Ying Yang
(74) *Attorney, Agent, or Firm* — Peter J. Edwards

(57) ABSTRACT

A user-wearable device comprises a device band and a housing section connected to the device band. The housing section comprises a roller and an extendable display spooled around the roller. The extendable display comprises a first end that is attached to the roller. The user-wearable device also comprises an anchor that is attached to a second end of the extendable display and that is located outside the housing section. The user-wearable device comprises a locking mechanism attached to the anchor. Separating the anchor from the housing section causes the extendable display to unspool from the roller and extend out of the housing section.

18 Claims, 6 Drawing Sheets

(56) References Cited

U.S. PATENT DOCUMENTS

| | | | |
|---|---|---|---|
| 2017/0278436 A1* | 9/2017 | Chu | H01L 51/0097 |
| 2018/0232120 A1* | 8/2018 | Son | G06F 1/1643 |
| 2018/0376603 A1* | 12/2018 | Lee | G06F 1/1652 |
| 2019/0220166 A1 | 7/2019 | Nagaraju et al. | |
| 2019/0282166 A1 | 9/2019 | VanBlon et al. | |
| 2021/0022258 A1* | 1/2021 | Yu | H05K 5/0017 |

OTHER PUBLICATIONS

Myers, "This Is What Your Smartwatch Is Doing to Your Sad, Chafed Wrist Skin," Mel Beta, Printed Jan. 28, 2020, 2 pages, https://melmagazine.com/en-us/story/apple-watch-smartwatch-rash-itch-bump-red-spots.

Shukla, Samsung Galaxy Watch Owners Complaining About Rashes, Burns, Skin Reactions, Value Walk, Oct. 15, 2018, 6 pages, https://www.valuewalk.com/2018/10/samsung-galaxy-watch-skin-rashes/.

Kim, "Wearables still haven't solved the problems of skin science, but new ideas are coming," Wearable, Health and Wellbeing Wearable Technology Feature, Nov. 18, 2017, 3 pages, https://www.wareable.com/health-and-wellbeing/skin-science-complex-wearables-4441.

Gartenberg, "Apple patents self-adjusting Apple Watch bands," The Verge, Oct. 10, 2017, 2 pages, https://www.theverge.com/2017/10/10/16452402/apple-patent-watch-band-automatic-adjustment-biometri.

Torres, "This smartwatch prototype moves in five different ways," Slash Gear, May 9, 2017, 7 pages, https://www.slashgear.com/this-smartwatch-prototype-moves-in-five-different-ways-09484425/.

Patnaikuni et al., "Magnetically Orbiting User-Worn Device", U.S. Appl. No. 16/815,337, filed Mar. 11, 2020.

List of IBM Patents or Patent Applications Treated as Related, Dated Mar. 10, 2020, 2 pages.

"Rollable display," Wikipedia, Edited Jul. 31, 2019, 3 pages, https://en.wikipedia.org/wiki/Rollable_display.

Purcher, "Samsung Chalks Up Another Granted Patent for a Next-Gen Scrollable Device using Infinity Flex Displays," Patently Mobile, Jan. 30, 2019, 5 pages, https://www.patentlymobile.com/2019/01/samsung-chalks-up-another-granted-patent-for-a-next-gen-scrollable-device-using-infinity-flex-displays.html.

Niu, "BTP: A bedtime Predicting Algorithm via Smartphone Screen Status," Hindawi: Wireless communications and Mobile Computing, vol. 2018, Oct. 22, 2018, 11 pages, available at: http://downloads.hindawi.com/journals/wcmc/2018/7619102.pdf.

McMillan et al., "Situatiing Wearables: Smartwatch Use in Context," ACM Conference on Human Factors in Computing Systems (CHI), May 6-11, 2017, 13 pages, available at: http://airilampinen.fi/files/p3582-mcmillan.pdf.

De Arriba-Perez et al., "Collection and Processing of Data from Wrist Wearable Devices in Heterogeneous and Multiple-User Scenarios," Sensors (Basel), vol. 16:9 1538, Sep. 21, 2016, 31 pages, available at: https://www.ncbi.nlm.nih.gov/pmc/articles/PMC5038811/pdf/sensors-16-01538.pdf.

Porter, "Nubia's New Wearable Puts a 4-Inch Flexible Smartphone on your Wrist," The Verge, Feb. 25, 2019, 7 pages, https://www.theverge.com/circuitbreaker/2019/2/25/18240370/nubia-alpha-release-date-price-features-wearable-smartwatch-flexible-display-mwc-2019.

* cited by examiner

USER-WORN DEVICE WITH EXTENDABLE DISPLAY

BACKGROUND

The present disclosure relates to user worn devices, and more specifically, to the displays of user-worn devices.

User-worn electronic devices sometimes include displays (e.g., LCD displays, OLED displays) to provide the user with information or allow the user to interact with the device. Some displays provide users with messages and other notifications that may be displayed in text format, graphical format, or a mixture of text format and graphical format. Some displays include touchscreen capability, allowing the user to provide inputs to the device through the display.

Smartwatches are a type of user-worn electronic device that often include a display and touchscreen capability. The typical smartwatch is worn on a user's wrist, and thus the size of the typical smartwatch display is limited; displays over a certain size may make the smartwatch impractical to use.

SUMMARY

Some embodiments of the present disclosure can be illustrated as a user-wearable device. The user-wearable device comprises a first housing section that comprises a roller. The user-wearable device comprises a second housing section that comprises an anchor. The user-wearable device also comprises an extendable display that is spooled around the roller. The extendable display comprises a first end attached to the roller and a second end attached to the anchor. Separating the first housing section from the second housing section causes the extendable display to unspool from the roller and span the gap between the first housing section and the second housing section.

Some embodiments of the present disclosure can also be illustrated as a user-wearable device that comprises a device band. The user-wearable device also comprises a housing section that is connected to the device band. The housing section comprises a roller and an extendable display spooled around the roller and comprising a first end attached to the roller. The user-wearable device also comprises an anchor that is attached to a second end of the extendable display and that is located outside the housing section. The user-wearable display also comprises a locking mechanism attached to the anchor. Separating the anchor from the housing section causes the extendable display to unspool from the roller and extend out of the housing section.

Some embodiments of the present disclosure can also be illustrated as a user-wearable device. The user-wearable device comprises a first housing section and a second housing section. The first housing section comprises a first roller and first movement mechanism and the second housing section comprises a second roller and a second movement mechanism. The user-wearable device also comprises a device band that comprises an attachment track. The user-wearable device also comprises an extendable display that is spooled around the first roller and the second roller. The extendable display comprises a first end connected to the first roller and a second end connected to the second roller. The first movement mechanism interacts with the attachment track to cause the first housing section to orbit around the attachment track. The second movement mechanism interacts with the attachment track to cause the second housing section to orbit along the attachment track. The first housing section and the second housing sections separating from each other causes the extendable display to unspool from the first and second roller and span the gap between the first housing section and second housing section.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
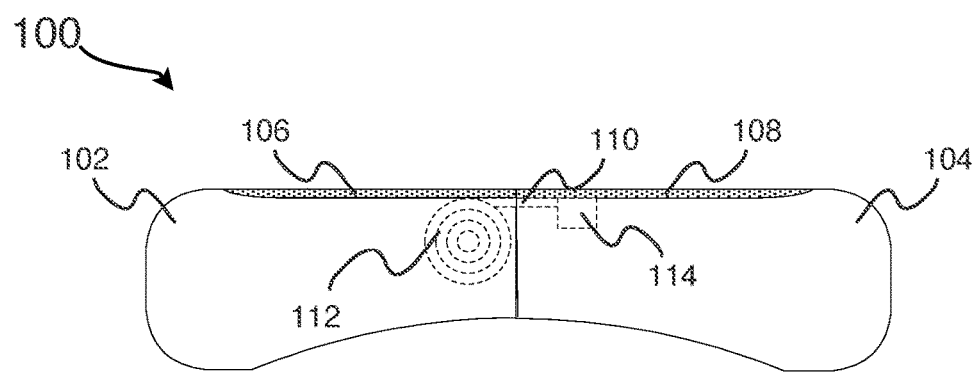
FIG. 1A depicts a side view of a user-wearable display in a retracted configuration.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to user-wearable devices, more particular aspects relate to displays of user-wearable devices. While the present disclosure is not necessarily limited to such applications, various aspects of the disclosure may be appreciated through a discussion of various examples using this context.

User-wearable electronic devices often include electronic displays (e.g., liquid crystal displays, organic light-emitting diode displays) that can present information to, for example, the users who are wearing those electronic devices. For example, a heart-rate monitor worn around a user's wrist may display that user's heart rate for the user to view. Similarly, a smartwatch may, in addition to displaying the time to the user, display calendar notifications, emails and other text messages, and alerts from applications on the user's smartphone. Some smartwatches, in addition to displaying information to the user, may also allow the user to interact with the smartwatch via a touchscreen display. For example, a smartwatch may display an SMS message to a user and allow that user to send a response to the message using the smartwatch display.

Some smartwatches sync up to a user's other smart device (e.g., a smartphone), allowing the user to perform some or all of the actions that the user would be able to do on the other smart device on the smartwatch itself. For example, some smartwatches include cellular-communication capabilities, allowing them to send emails and messages, place and receive phone calls, and access the Internet and utilize Internet-dependent applications. This may be useful, for example, when a user wishes to move out of range of his or her smartphone but still be able to communicate and function as if his or her smartphone were accessible. For example, some users with large smartphones do not wish to be hindered by their smartphones when exercising, moving throughout the house, or others, but may still wish to be available to receive and respond to messages, calls, and notifications. Further, some users prefer to keep their smartphone in their bags or pockets when receiving a quick call or responding to an email.

However, many of these capabilities require large display sizes, either for readability purposes or for ease of interaction purposes. For example, some messages include a lot of text that is difficult to read on small displays, or may include media (e.g., a video message) that is difficult to view on small displays. Similarly, composing messages such as emails is often difficult on small displays, because the display may be too small to fit an entire keyboard and a view of the message being composed. Some users may also desire to quickly show a piece of multimedia (e.g., a picture or video) to another person, but viewing that multimedia on a small display may be difficult, particularly if the multimedia is viewed in a wide aspect ratio (e.g., a widescreen 16:9 movie), they may be difficult to view on a small display narrower aspect ratio (e.g., 4:5 display).

For this reason, increasing the display size of some user-worn displays may be beneficial in some use cases. However, the standard display size of the typical user-worn display is limited by the need for that user-worn display to be practical to wear. For example, a smartwatch with a 5-inch display may be very useful to view and interact with, but most users would not find it practical to wear a watch with a 5-inch display. Similarly, a the information on a biometric monitor such as a heart-rate and blood-pressure monitor may be more easily read if the display of the device were very large, but a very large device may be cumbersome to wear and may easily become dislodged from a position in which it can accurately read a biometric signal.

Some embodiments of the present disclosure address these issues by incorporating an extendable display into a user-worn device, such as a smartwatch. The extendable display may, in a retracted configuration, remain largely rolled up within the housing of the user-worn device. This may prevent the display from significantly increasing the size of the overall device, making the device less cumbersome to wear. In an extended configuration, the display may unroll and span a gap between two sections of the user-worn-device housing, increasing the effective display size.

For example, a user-worn device may contain two housing sections. One or both of the housing sections may feature an external display that the user may use to view information and interact with. One or both of the housing sections may also feature an internal extendable display. This extendable display may take the form of a flexible liquid-crystal display (sometimes referred to herein as an "LCD") that is rolled up on a roller mechanism in the display housing. For example, one end of the extendable display may attach to a roller inside the first housing section, and the second end of the extendable display may attach to something (e.g., a second roller) inside the second housing section. When the user may desire to use a larger display than the external display (or displays), the two housing sections may be separated from each other, and the extendable display may extend to fill the space between the two housing sections.

In another example, a user-worn device may contain a single housing section that features an extendable display within the housing. One end of the extendable display may be attached to a roller, while the other end of the extendable display may be attached to a handle that is outside the housing. When the user may desire to view the extendable display, the user may pull the handle out to extend the display.

In some embodiments of the present disclosure, an extendable display may be attached to a roller that automatically retracts the display when it is not in use. For example, a roller in a housing of a user-worn device may be attached to a motor or spring that has a tendency rotate the roller, causing it to pull the display into the housing and wrap the display around the roller. In some embodiments, this may allow the user to manually pull out the display and hold it in place while using it (e.g., while reading a long text message or watching a short video message), then simply let go to allow the roller to automatically retract the display.

However, an extendable display that only remains extended when it is actively being held by a user may not be useful in some instances. For example, a user may want his or her hand free to type a message on the user-worn device, but may require the extendable display to be visible so the user can view the message as he or she types it. In this example, the user may be unable to hold open the display open while typing the message, which may make the display automatically retracting inconvenient.

Thus, some embodiments of the present disclosure also feature an extendable display that can lock in place once extended, but that can automatically retract when the lock is released. In some embodiments, for example, the handle by which an extendable display may be extended may feature an object that can be inserted into a hole in the user-wearable device to hold the display in place. For example, the handle on the end of an extendable display on a smartwatch may contain a knob that can be inserted into the band of the smartwatch to keep the extendable display from retracting. In other embodiments, the extendable display may be connected to a magnet or electromagnet that may be magnetically attracted to a second magnet in the user-worn device.

Further, some embodiments of the present disclosure may feature and extendable display that may extend automatically by the use of some type of motor mechanism, which may also be used to hold the display in place. For example, a smartwatch may feature an extendable display between two housing sections. One or both of the housing sections could also contain motors that interact with a track on the smartwatch band. Those motors may be capable of causing the housing sections to orbit around the band independently, and may thus be capable of causing the housing sections to separate from each other. If such a motor causes the housing sections to separate, the extendable display may extend to span the distance between the two housing sections. Those motors may also be used to keep the two housing sections separated, thus keeping the extendable display extended. In some embodiments, the user-worn device may also feature other locking mechanisms, such as an electromagnet in the housing sections that are magnetically attracted to magnets in a wristband of the user-worn device.

FIG. 1A illustrates a side view of an example user-wearable device 100 (sometimes referred to herein as "device 100") with an extendable display that is in a retracted state. Device 100 features two housing sections 102 and 104. Housing sections 102 and 104, as illustrated, each contain an external display, external displays 106 and 108. External displays may be capable of providing the user with information during normal wear in the retracted state, and may also feature touchscreen capabilities.

Device 100 also features extendable display 110. Extendable display 110 is illustrated here, along with other features that are concealed by housing sections 102 and 104, with dotted lines. These dotted lines indicate that, in the present retracted configuration, extendable display would not be visible from the outside of device 100. One end of extendable display 110 attaches to a roller 112 that is inside housing section 102. Roller 112 may be connected to a spring, which may help keep extendable display 110 in the retracted state unless held in the extended state. Roller 112 may also allow extendable display 110 to be stored compactly, allowing extendable display to be larger (and thus more useful) than it otherwise may be. A second end of extendable display 110 attaches to an anchor 114 that is stored within housing section 104. As illustrated, anchor 114 takes the form of a static anchor point. However, in some embodiments it may be beneficial for anchor 114 to take the form of a second roller around which extendable display 210 may be wrapped. This may allow extendable display to be longer and potentially more useful.

Figure 1B:
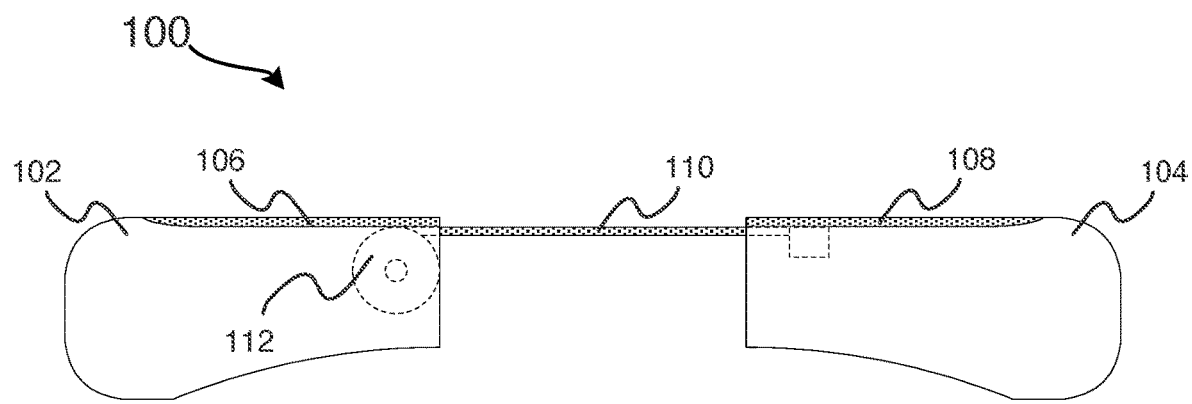
FIG. 1B depicts a side view of a user-wearable display in an extended configuration.

FIG. 1B illustrates a side view of device 100 in an extended state. As illustrated, housing sections 102 and 104 have separated. This separation may have been caused by, for example, a user pulling housing sections 102 and 104 apart or a motor driving them apart. The action of pulling housing sections 102 and 104 apart has caused extendable display 110 to unwind roller 112, and thus extendable display 110 now spans the distance between housing sections 102 and 104. As illustrated, external display 106, extendable display 110, and external display 108 effectively form one large display. This may be useful for viewing large messages, widescreen format media, or interacting with the display in a way that would be impractical in the retracted state (i.e., the state illustrated in FIG. 1A.

In some embodiments, both housing sections 102 and 104 may be relocated in order to extend extendable display 110. In some embodiments, only one of housing sections 102 and 104 may be relocated in order to extend extendable display 110. In these embodiments, either the housing section containing roller 112 or anchor 114 may be relocated. It is of note that, throughout this disclosure, examples are provided of housing sections containing an anchor, rather than a roller, are extended. It is to be understood that, in these examples, the locations of the roller and the anchor could be switched where it is otherwise consistent with the presented embodiment.

Figure 2A:
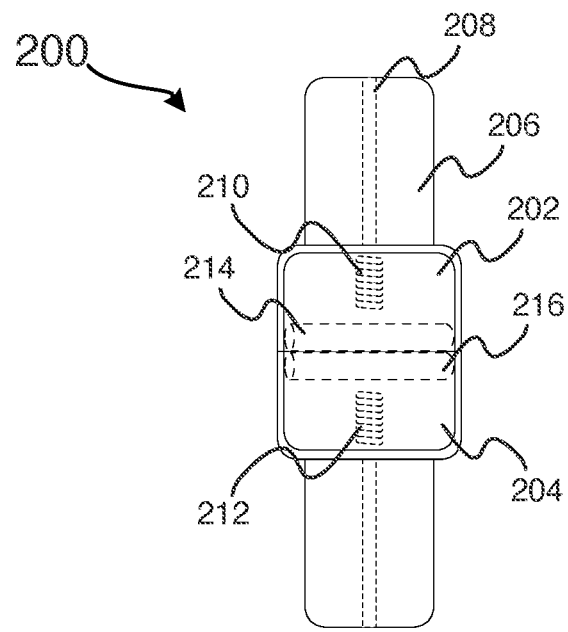
FIG. 2A depicts a top view of a smartwatch with an extendable display in a retracted configuration.

FIG. 2A illustrates a top view of a smartwatch 200 with an extendable display that is in a retracted state. Smartwatch 200 features housing sections 202 and 204, both of which are attached to wristband 206. Wristband 206 features attachment track 208, by which housing sections 202 and 204 may attach to wristband 206. Housing section 202 and 204 may also be capable of moving along attachment track 208, which may enable housing sections 202 and 204 to separate with respect to each other while still remaining attached to wristband 206. To facilitate this movement, housing sections 202 and 204 also feature movement mechanisms 210 and 212.

Attachment track 208 is illustrated here, along with movement mechanisms 210 and 212 and other features that are concealed by housing sections 202 and 204, with dotted lines. These dotted lines indicate that, in the present retracted configuration, extendable display would not be visible from the outside of smartwatch 200.

Movement mechanisms 210 and 212 may interact with attachment track 208 in a way that not only holds housing sections 202 and 204 to the wristband 206, but also enables the housing sections to move. The nature of this interaction may depend on the forms that attachment track 208 and movement mechanisms 210 and 212 take. For example, in some embodiments attachment track may be a physical rail located on the exterior of wristband 206. In these embodiments movement mechanisms 210 and 212 may take the form of a physical motor that drives gears located within attachment track 208. Those gears may interface with corresponding teeth on attachment track 208, causing housing sections 202 and 204 to move along attachment track 208 when movement mechanisms 210 and 212 operated.

In some embodiments, attachment track 208 may take the form of a magnetic wire, strip, or coil that is embedded within wristband 206. For example, attachment track 208 may be a permanent magnet (e.g., a rare-earth magnet) or an electromagnet. In these embodiments, attachment track 208 may create a magnetic field to which housing sections 202 and 204 (or a component thereof) is attached. In these embodiments movement mechanisms 210 and 212 may take the form of one or more electromagnets that, when powered, may interact with the magnetic field produced by attachment track 208. This interaction may create a magnetic force on housing sections 202 and 204, which may then cause housing sections 202 and 204 to move along attachment track 208.

Housing sections 202 and 204 also contain rollers 214 and 216 around which an extendable display 218 (not visible in FIG. 2A) is wound. As illustrated in FIG. 2A, smartwatch 200 is in a retracted configuration, and thus extendable display 218 is concealed within housing sections 202 and 204.

Figure 2B:
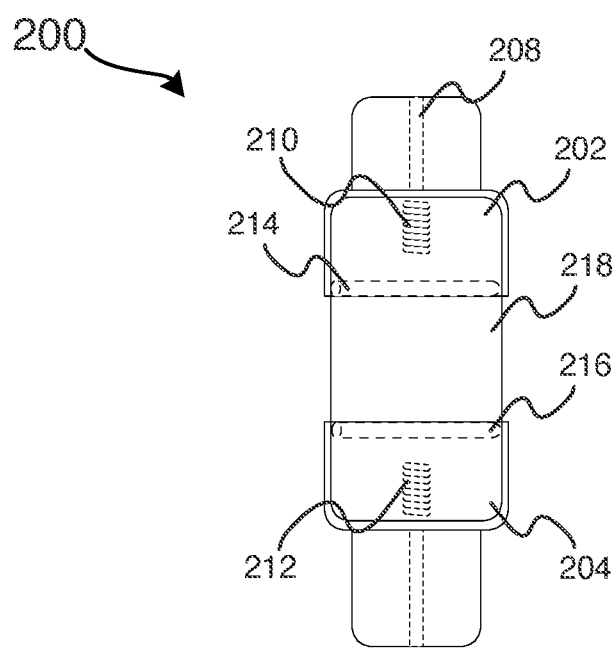
FIG. 2B depicts a top view of a smartwatch with an extendable display in an extended configuration.

FIG. 2B, however, illustrates smartwatch 200 in an extended configuration. As illustrated, housing sections 202 and 204 have separated with respect to each other by moving along attachment track 208. This movement may have been caused by movement mechanisms 210 and 212 interacting with attachment track 208, as discussed with respect to FIG. 2A.

The separation of housing sections 202 and 204 has caused extendable display 218 to unravel from rollers 214 and 216 and span the gap between movement sections 202 and 204. Thus, in this configuration, extendable display 218 is visible and able to be used for displaying information to the user. Further, if either (or both) of housing sections 202 and 204 also contain external displays, those external displays may, together with extendable display 218, effectively create one display that is larger than may be practical with a standard, non-extendable display on a smartwatch.

In some embodiments, movement mechanisms 210 and 212 may be capable of locking housing sections 202 and 204 in place in the extended configuration illustrated in FIG. 2B, the retracted configuration illustrated in FIG. 2A, or any position between the two. For example, movement mechanisms may comprise physical motors that may prevent gears within attachment track 208 from moving. Those gears may interact with teeth within attachment track 208, and which may prevent housing sections 202 and 204 from moving along wristband 206. In some embodiments, housing sections may lock in place by other means. For example, powerful magnets may be embedded at particular locations within wristband 206. These magnets may interact with the shell of housing sections 202 and 204 or magnetic objects within housing sections 202 and 204. This interaction may create a magnetic attraction that is strong enough that it prevents housing sections 202 or 204 from freely moving along attachment track 208. However, movement mechanisms 210 and 212 may be engaged to overpower that magnetic attraction.

Figure 3A:
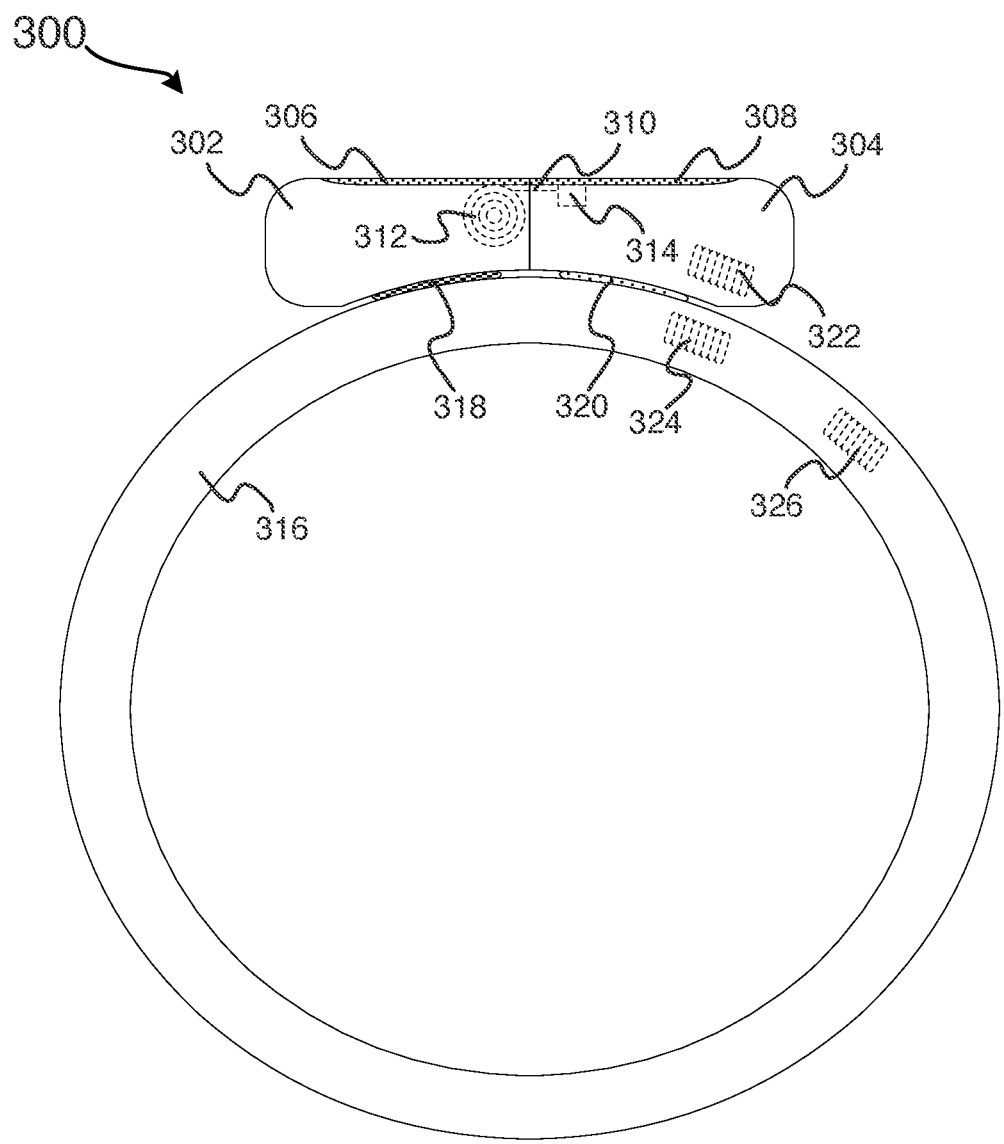
FIG. 3A depicts a side view of a smartwatch with an extendable display that is locked in a retracted configuration.

FIG. 3A illustrates a sideview of a smartwatch 300 with an extendable display that is in a retracted state. Smartwatch 300 contains housing sections 302 and 304 that each contain an external display 306 and 308. Smartwatch 300 also features extendable display 310. Extendable display 310 is illustrated here, along with other features that are concealed by housing sections 302 and 304, with dotted lines. These dotted lines indicate that, in the present retracted configuration, extendable display would not be visible from the outside of smartwatch 300.

One end of extendable display 310 attaches to a roller 312 that is inside housing section 302. Roller 312 may be connected to a spring, which may help keep extendable display 310 in the retracted state unless held in the extended state. Roller 312 may also allow extendable display 310 to be stored compactly, allowing extendable display to be larger (and thus more useful) than it otherwise may be. A second end of extendable display 310 attaches to an anchor 314 that is stored within housing section 304.

Smartwatch 300 also contains wristband 316 that may be worn around a user's wrist. As illustrated, housing section 302 may be securely attached to wristband 316 with attachment mechanism 318. Attachment mechanism 318 may comprise, for example, an adhesive, a chemical bond, a welded bond, or a mechanical connection such as two interlocking pieces. Housing section 304, on the other hand, may contain spacer 320, which may not be attached to wristband 316, but may operate to keep housing section 304 at the appropriate distance from wristband 316. For example, spacer 320 may enable housing sections 302 and 304 to maintain the same distance from wristband 316, causing external displays 306 and 308 to be flush with one another. In some embodiments, housing section 302 may attach to wristband 316 without any distance being created between housing section 302 and wristband 316, in which case spacer 320 may be unnecessary.

Housing section 304 also contains magnet 322. Locking magnet 322 may be a permanent magnet (e.g., a charged ferromagnet or rare-earth magnet) or an electromagnet that is powered by a battery. Locking magnet 322, as illustrated in FIG. 3A, is configured to interact with locking magnet 324, which is illustrated as embedded within wristband 316. This interaction may cause a magnetic attraction between housing section 304 and wristband 306. This magnetic attraction may thus prevent housing section 304 from freely moving away from the position illustrated in FIG. 3A, effectively locking smartwatch 300 in the retracted configuration until acted on by an external force. Wristband 316 may also have locking magnet 326, which, while also embedded in wristband 316, may not be significantly interacting with any other referenced components in FIG. 3A.

While, as illustrated and described, locking magnets 322, 324, and 326 take the form of magnets (permanent magnets or electromagnets), in some embodiments they could take the form of other locking mechanisms. For example, in some embodiments locking magnet 322 could take the form of a knob or hook, and locking magnets 324 and 326 may each take the form of holes into which the knob could be inserted or loops through which the hooks could be wound.

Figure 3B:
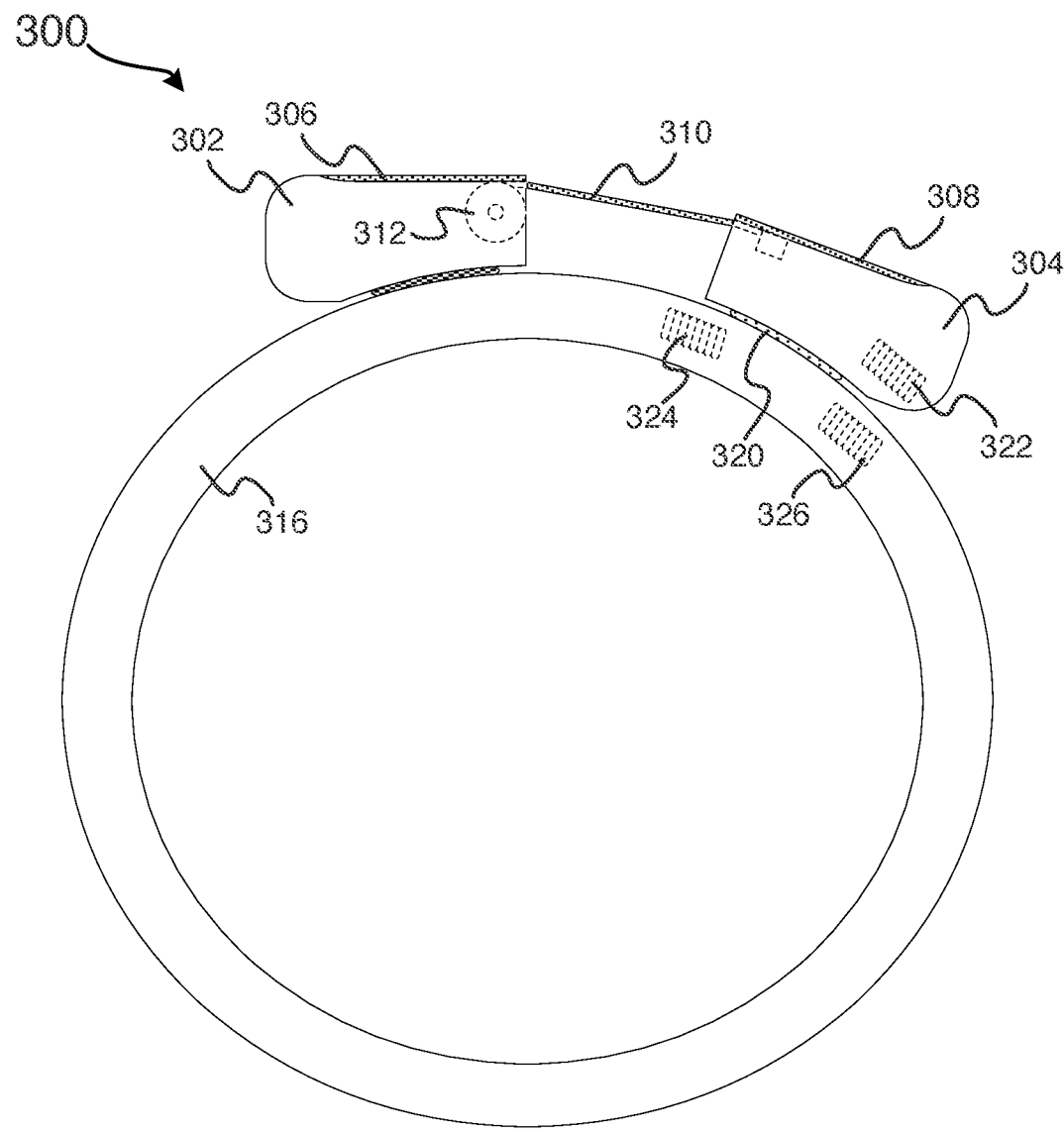
FIG. 3B depicts a side view of a smartwatch with an extendable display that is locked in an extended configuration.

FIG. 3B illustrates smartwatch 300 in an extended configuration. Smartwatch 300 may move to the extended configuration, for example, by a user grabbing housing section 304, overpowering the attraction between locking magnets 322 and 324, pulling housing section 304 away from housing section 302, and bringing locking magnet 322 close enough to locking magnet 326 to create a magnetic attraction that may prevent housing section 304 from freely moving away from that position. In some embodiments, housing section 304 may move away from housing section 302 on a track that is attached to the external surface of wristband 316. This may be beneficial, for example, to prevent housing section 304 from moving in a direction that is unintended or moving farther than intended, potentially damaging extendable display 310. For example, spacer 320 may, in some embodiments, travel in a groove along wristband 316 that prevents spacer 320 from being pulled away from wristband 316 or further away from housing section 302 without a significant force being applied.

In the extended configuration, extendable display 310 has unspooled from roller 312 and now spans the gap between housing section 302 and housing section 304. As such, external display 306, extendable display 310, and external display 308 effectively form one large display. As illustrated, the attraction between locking magnets 322 and 326 may keep smartwatch 300 in this extended configuration until acted on by an external force (e.g., a user overpowering the attraction between locking magnets 322 and 326). However, in some embodiments, locking magnet 326 may not be included in smartwatch 300, and smartwatch 300 may return to the retracted configuration automatically (for example, when the user releases housing section 304).

Figure 4A:
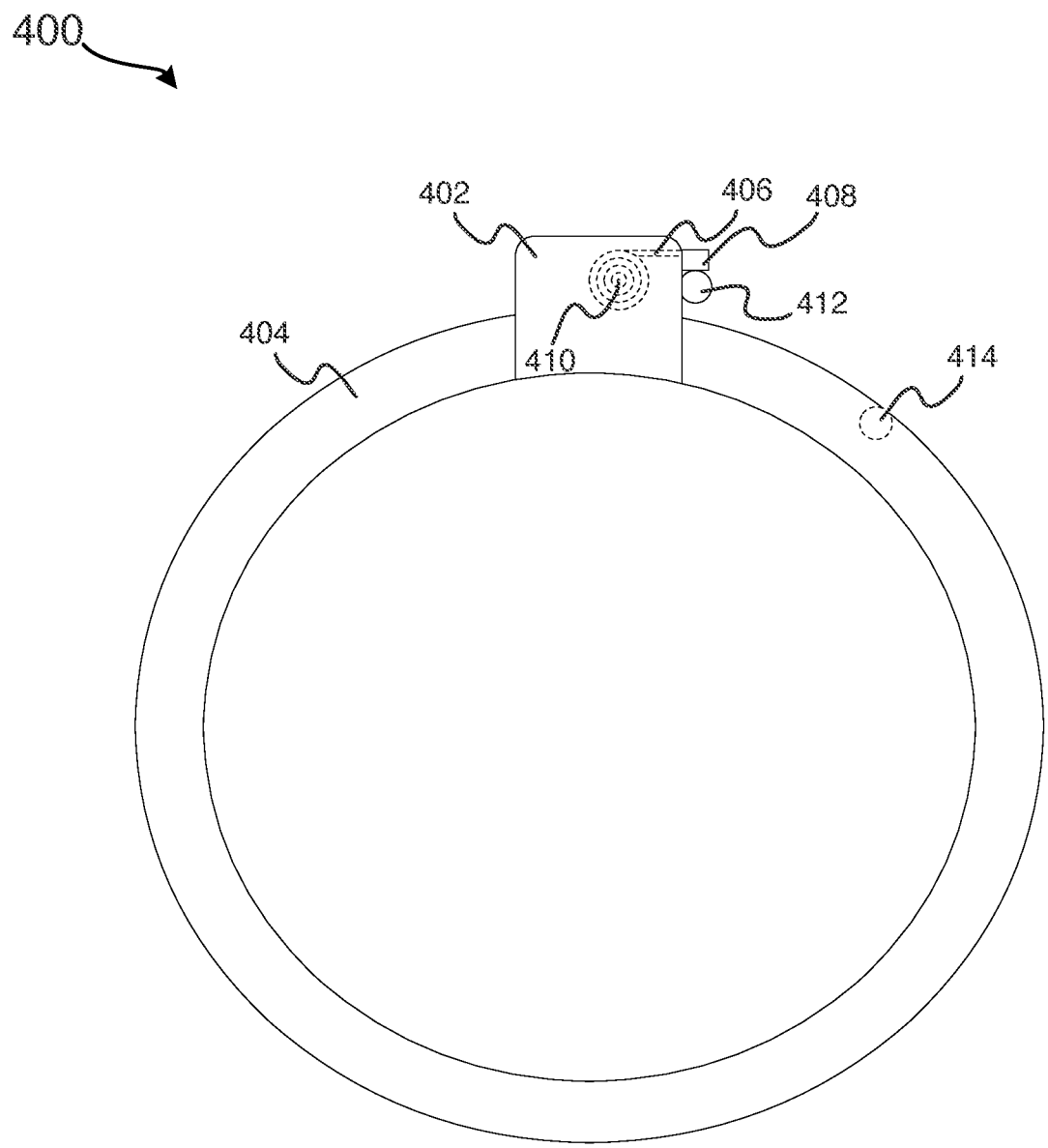
FIG. 4A illustrates a side view of a user-wearable device with an extendable display but without an external display that is in a retracted configuration.

FIG. 4A illustrates a user-wearable device 400 with an extendable display in the retracted configuration. User-wearable device 400 may be, for example, a biometric monitor (e.g., a heart-rate monitor) or a communication device (e.g., a smart watch or pager). User-wearable device 400, as illustrated, does not feature an external display. While some embodiments of the present disclosure may feature devices that are otherwise similar to user-wearable device 400 but that also feature an external display, it may be beneficial for user-wearable device 400 to not feature an external display in some use cases. For example, user-wearable device 400 may operate similar to a smartwatch, but may be designed for very rugged environments in which an external display would likely be damaged. As another example, user-wearable device 400 may be designed for situations in which a device large enough to feature an external display may be impractical or undesirable, but for which an extendable display may be beneficial.

User-wearable device 400 features housing 402. Housing 402 may be attached to device band 404. Device band 404 may be a wristband, arm band, or other band that attaches user-wearable device 400 to a user's body. Housing 402 may also contain extendable display 406. One end of extendable display 406 is attached to anchor 408, whereas other end of extendable display 406 is attached to roller 410. In the retracted state illustrated in FIG. 4A, extendable display 406 is spooled around roller 410.

Anchor 408 may be attached to locking knob 412, which may be a locking mechanism used to secure user-wearable device 400 in the extended configuration. Device band 404 may also contain locking hole 414, which may be configured to interlock with locking knob 412.

Figure 4B:
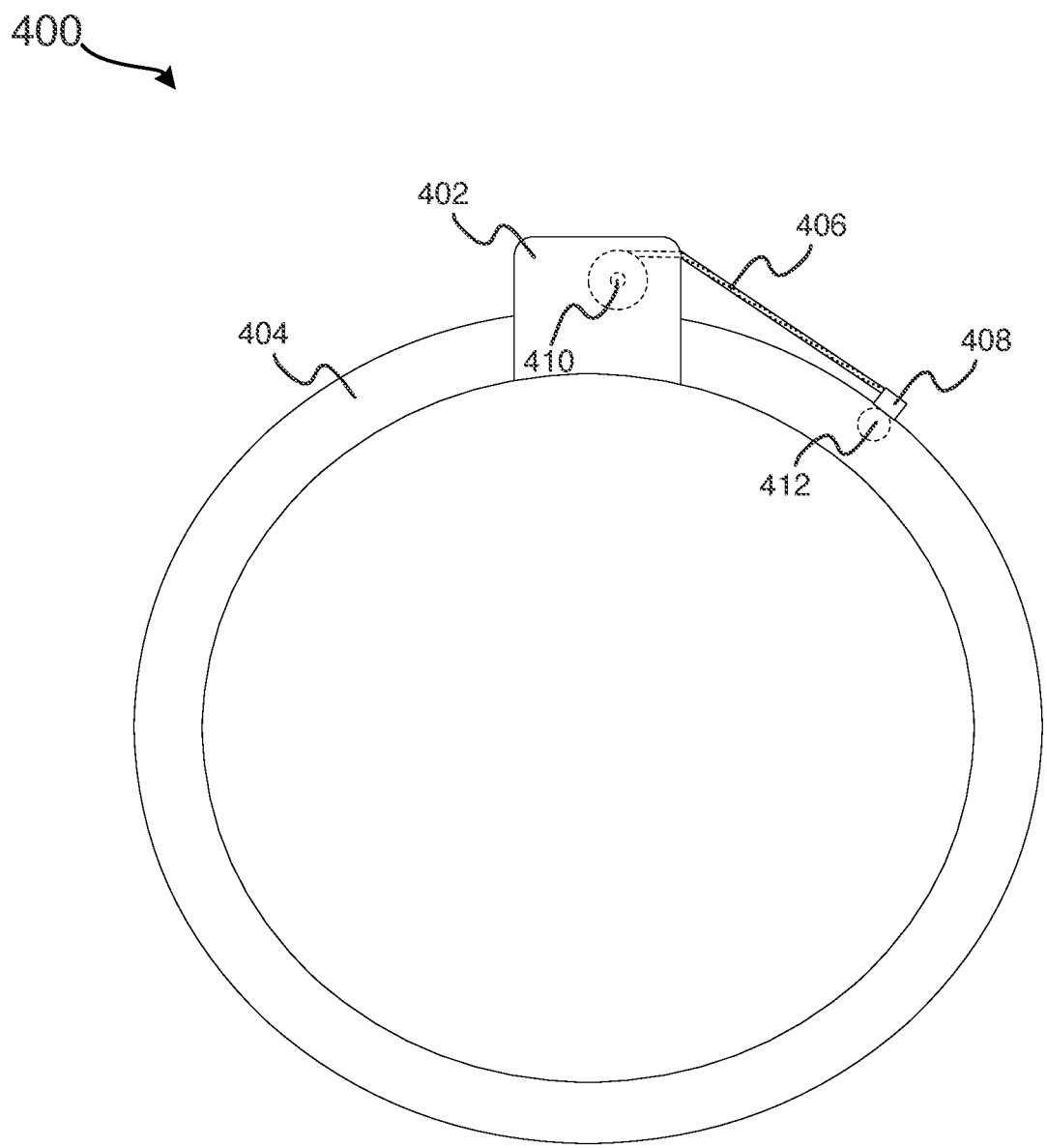
FIG. 4B illustrates a side view of a user-wearable device with an extendable display but without an external display that is locked in an extended configuration.

FIG. 4B illustrates the user-wearable device 400 in the extended configuration. User-wearable device 400 may have been placed into the extended configuration by a user pulling the anchor from its previous location, unspooling extendable display 406 from roller 410. Locking knob 412 is illustrated as inserted into locking hole 414 (not pictured in FIG. 4B), which may prevent user-wearable device 400 from freely reverting back to the retracted configuration.

When user-wearable device 400 is in the extended configuration, a user may view information on extendable display 406. When the user is finished viewing extendable display 406, the user could remove locking knob 412 from locking hole 414 (not pictured in FIG. 4B) by pulling on anchor 408. If roller 410 is attached to a spring, the user could then let go of anchor 408 or move anchor 408 towards housing 402 to return user-wearable device 400 to the retracted configuration. This may be useful to prevent damage from occurring to extendable display 406 or to reduce the size of user-wearable device 400, making it more convenient to wear.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A user-wearable device comprising:
a first housing section comprising a roller;
a second housing section comprising an anchor;
an extendable display spooled around the roller and comprising a first end attached to the roller and a second end attached to the anchor; and
a device band that comprises an attachment track;
a movement mechanism attached to the second housing section;
wherein separating the first housing section from the second housing section causes the extendable display to unspool from the roller and span the gap between the first housing section and the second housing section; and
wherein an interaction between the movement mechanism and the attachment track causes the second housing section to orbit along the attachment track.

2. The user-wearable device of claim 1, wherein the device band comprising a first locking mechanism and
wherein the second housing section comprises a second locking mechanism, and wherein an interaction between the first locking mechanism and second locking mechanism prevents the extendable display from freely spooling onto the roller.

3. The user-wearable device of claim 2, wherein the first locking mechanism and second locking mechanism comprise magnetic locks.

4. The user-wearable device of claim 1, further comprising:
the device band comprises a third locking mechanism;
wherein the second housing comprises the second locking mechanism, and wherein an interaction between the third locking mechanism and second locking mechanism prevents the extendable display from freely unspooling from the roller.

5. The user-wearable device of claim 1, wherein the interaction between the movement mechanism and the attachment track causes the second housing section to separate from the first housing section.

6. The user-wearable device of claim 1, wherein the anchor comprises a second roller.

7. The user-wearable device of claim 1, wherein the roller is attached to a spring that causes the roller to retract the display.

8. The user-wearable device of claim 1, wherein the user-wearable device comprises a smartwatch.

9. The user-wearable device of claim 1, wherein the first housing section comprises an external display.

10. A user-wearable device comprising:
a device band that comprises an attachment track;
a housing section connected to the device band, the housing section comprising:
a roller;
an extendable display spooled around the roller and comprising a first end attached to the roller;
an anchor attached to a second end of the extendable display, wherein the anchor is located outside the housing section; and
a movement mechanism attached to the anchor, wherein an interaction between the movement mechanism and the attachment track causes the anchor to orbit along the attachment track;
a locking mechanism attached to the anchor;
wherein separating the anchor from the housing section causes the extendable display to unspool from the roller and extend out of the housing section.

11. The user-wearable device of claim 10, wherein the housing section comprises an external display.

12. The user-wearable device of claim 10, wherein the user-wearable device comprises a biometric monitor.

13. A user-wearable device comprising:
a first housing section comprising:
a first roller; and
a first movement mechanism;
a second housing section comprising:
a second roller; and
a second movement mechanism;
a device band comprising:
an attachment track;
an extendable display spooled around the first roller and second roller, the extendable display comprising:
a first end connected to the first roller; and
a second end connected to the second roller;
wherein the first movement mechanism interacts with the attachment track to cause the first housing section to orbit along the attachment track;
wherein the second movement mechanism interacts with the attachment track to cause the second housing section to orbit along the attachment track; and
wherein the first housing section and second housing section separating from each other causes the extendable display to unspool from the first and second roller and span the gap between the first housing section and the second housing section.

14. The user-wearable device of claim 13, wherein the first movement mechanism is configured to prevent the first housing section from freely moving in the attachment track.

15. The user-wearable device of claim 13, further comprising:
a first locking magnet embedded within the device band; and a second locking magnet connected to the first housing section;

wherein the device band can attach the user-wearable device to a user's body and the first locking magnet and second locking magnet interact to prevent the first housing mechanism from freely moving in the attachment track.

16. The user-wearable device of claim 15, wherein the first locking magnet is a permanent magnet and the second locking magnet is an electromagnet.

17. The user-wearable device of claim 13, further comprising:

a first external display located on the first housing section; and a second external display located on the second housing section.

18. The user-wearable device of claim 13, wherein the user-wearable device is a smartwatch.

* * * * *